Patented Sept. 14, 1954

2,689,166

UNITED STATES PATENT OFFICE 2,689,166

HYGROSCOPIC WATER-SOLUBLE SOLID BODIES MADE WATER-RESISTANT AND PROCESS THEREFOR

John B. Rust, Montclair, and Leonard Spialter, Irvington, N. J., assignors, by direct and mesne assignments, of one-half to Montclair Research Corporation and one-half to Ellis-Foster Company, both corporations of New Jersey No Drawing. Application November 5, 1945, Serial No. 626,889

12 Claims. (Cl. 23—89)

This invention relates to the treatment of solid substances in granular, particulate, powdered or crystalline condition to give them water repellent characteristics, to reduce hygroscopicity, tendency toward caking, etc., to methods of producing such treated products, to materials utilized for such purposes, and to packages containing such products.

Heretofore, some substances like table salt, have been mixed with extraneous substances to render them freerunning and to reduce tendency toward caking. But no general methods were available for treating materials in reduced particle size form to make them water repellent, or non-hygroscopic, to prevent caking, etc.

Among the objects of the present invention is the treatment of solid substances in reduced particle size such as granules, powders, crystals, etc., to make them water repellent, to reduce caking tendencies, to reduce or eliminate hygroscopicity.

Other objects include the treatment of substances as aforesaid by agents or methods which make no perceptible change in the treated materials other than in the properties stated above.

Other objects include the treatment of the stated materials to render them more impervious to water or water vapor or condensations of water in order to enhance their properties.

Still further objects and advantages of the present invention will appear from the more detailed description set forth below, it being understood, however, that this more detailed description is given by way of illustration and explanation only, and not by way of limitation, since various changes therein may be made by those skilled in the art without departing from the spirit and scope of the present invention.

In accordance with the present invention, it has been found possible to produce non-hygroscopic, or non-caking, products from substances both inorganic and organic in granular powdered, crystalline, or other particulate condition, by a surface treatment which does not visibly change the materials treated other than with respect to their water repellent properties as aforesaid. These results are accomplished by treating the stated materials with a silicon halohydride or an organo silicon halide in which the organo radical is selected from aliphatic and aromatic radicals. The silicon halohydrides particularly include the chlorhydrides of silicon which may be looked upon as entirely inorganic in character and includes silico chloroform, SiHCl₃, (trichlorsilane), dichlorsilane, etc.; and this phase of the invention will be particularly illustrated by the utilization of silico chloroform which represents a preferred manner of carrying out that phase of the invention.

The organo silicon halides include aliphatic, alicyclic and carbocyclic silicon halides. As the hydrocarbon substituents attached to the silicon in such organo silicon halides are included alkyl, aryl, olefinyl, alkenyl, alkynyl, arenyl and arynyl, that is generally aliphatic, including unsaturated groups such as the olefines and the groups derived from acetylene, aromatic including aryl, aralkyl, and alkaryl, alicyclic, and cycloaromatic groups illustrated specifically by methyl, ethyl, propyl, butyl, amyl, hexyl, heptyl, octyl, vinyl, allyl, butenyl, and the radicals from acetylene, methylacetylene, and so forth; cyclohexyl, benzyl, phenyl, tolyl, xenyl, chlorphenyl, styryl, and radicals from such derivatives as phenylacetylene.

Mixtures of the treating agents may be employed including mixtures of silicon halohydrides, or mixtures of organo silicon halides, or mixtures of one or more silicon halohydrides with one or more organo silicon halides of the character set forth above.

The treating agent whether a silicon halohydride or organo silicon halide, or mixtures thereof, may be applied in any desired way to the material in particulate, granular, crystalline or other condition. Where the silicon derivative is a vapor at ordinary temperatures or may be readily converted into vapor condition, it may be applied to the material in particle condition in the form of a vapor. Where solid materials are reduced to particle or powdered condition by powdering, grinding, or other operations, such operations may themselves be carried out in an atmosphere of the silicon treating agent, or the latter portion of the powdering, or grinding, or other operations may be carried out in an atmosphere of the treating agent to produce the effect desired. Or a bath of the silicon treating agent may be utilized for treating the powdered material either a bath of the silicon derivative alone where that is a liquid or may be utilized at temperatures at which forms a liquid, or it may be employed in solution in a vehicle, solvent, etc.

The length of time treatment is simply that which is necessary to produce the desired protective film to the extent sought on the material or product undergoing treatment. Thus the material in powdered or analogous condition may be exposed to vapors of the stated treating agents such as silico chloroform, or an atmosphere containing it, for varying lengths of time, such as from a few seconds to five minutes and up to several hours, depending upon the particle size, the surface area, and other characteristics of the material undergoing treatment. Such treatments may be carried out at ordinary temperatures although if desired, higher temperatures may be employed.

The exact explanation of the action of the treating agent is not known. Apparently, however, the material treated has an immeasurably small amount of a protective film formed thereon and is rendered strongly water repelling.

The material after treatment with the stated silicon containing substances, may subsequently be exposed if desired to moist air for a short period of time at elevated temperatures, but this is not essential. Any residual acidity on the material may be neutralized if necessary, by exposure of the treated material to a neutralizing agent such as ammonia or a volatile amine, and the like, or by blowing in an air stream, or by washing with water or some solvent for the acid.

The invention is particularly concerned with the treatment of hygroscopic materials to reduce their tendency to cake on storage. In addition it may be noted that the treatment tends to improve the free-flowing and pouring characteristics of the treated materials to a very marked degree. A significant utilization is in the treatment of inorganic and organic powders, crystalline materials, compounds, salts, etc. Thus agricultural fertilizers may be treated; explosive ingredients or compositions may be treated; and particularly the invention may be utilized in this connection for the treatment of any substances that exhibit high water absorption and tendency toward caking, which characteristics it is desired to eliminate or control for particular purposes. The variety of inorganic and organic powders, crystalline materials, granules, particles, etc. that may be treated are legion, but to illustrate them there may be mentioned such substances as monosodium phosphate, disodium phosphate, calcium chloride, ammonium nitrate, urea, cement, baking powders, sugar, salt, etc.

In this connection it should be pointed out that depending on the extent of treatment, it is possible in this way to control the solubility of a substance in a liquid or solvent and to reduce its rate of solution therein. This expedient may be employed both where mere solution without chemical reaction is desired, as well as where the treated components are to enter into reaction either with each other or with the liquid or solvent. And in fact, substances which must under other conditions be packaged separately to avoid interreaction between them, may be treated in accordance with the present invention to give them sufficient water repellency so that they may be packaged at one and the same time without separation in order to produce a package containing mixed materials which do not react until substantial quantities of water and sufficient length of time is available.

For some purposes, the substances in granular, powder, or other condition, may be treated successively with a silicon halohydride, such as silico chloroform, and then with an organo silicon halide, such as an alkyl silicon halide; or the steps of treatment may be reversed and the material treated with an alkyl silicon halide or other organo silicon halide first, followed by treatment with the silicon halohydride, such as silico chloroform. And such successive treatments may be carried out utilizing a vapor treatment in one stage followed by a liquid treatment in the other, or with a liquid or bath treatment in the first stage, followed by vapor treatment in the second. The treatment of materials with successive types of the silicon treating agents has advantages in some instances since the initial treatment conditions the material for the second treatment. Instead of using the same silicon derivative for treatment of all of the materials in a given batch, portions of the materials undergoing treatment may be treated with one type of treating agent and other portions with another type. Or where mixtures of hygroscopic substances, for example, are to be utilized, one of the substances may be treated with one type of silicon treating agent while the other is treated with another type of silicon agent and the resulting treated products then mixed to produce the final mixture desired.

Instead of treating the material alone, the treatment may be applied also to packages containing such substances and articles as set forth above, where the article within the package is one that is to be protected, particularly one which is to be protected against moisture. These methods may be applied directly to packages of the stated powdered, granular, or other substances, particularly when hygroscopic, and eliminate the difficulties heretofore experienced in the art in an attempt to produce sealed packages with wrapping material such as "Cellophane," wax paper, etc.

The following examples illustrate the invention:

*Example 1.*—Several fine dried inorganic and organic powders were treated with silico chloroform. These included monosodium phosphate, disodium phosphate, urea, calcium chloride, ammonium nitrate, and a special blend of agricultural fertilizer; all noted for their high water absorption and tendency towards caking.

The treatment consisted in dropping the powder rapidly through a six inch column of silico chloroform vapor. All powders so treated showed increased free-flowing and decreased water absorption and caking compared to untreated samples. In all cases, but calcium chloride, water repellency of the powders was so great that instead of sinking and dissolving rapidly in distilled water as the untreated powders did, the treated samples floated on the surface and dissolved slowly, in some cases, over a period of several days.

Quantitative measurements on the disodium phosphate showed that under ordinary indoor conditions untreated samples absorbed five times as much water as treated ones.

*Example 2.*—The same substances referred to in Example 1 above may be treated with the vapor of methyl silicon chloride under conditions analogous to those set forth above in Example 1 to improve the water repellency of the powders, to reduce caking, etc.

*Example 3.*—The same substances as those set forth in Example 1 above may be treated in an atmosphere containing a mixture of vapors of silico chloroform and methyl silicon chloride under conditions and methods of treatment analogous to those set forth in Example 1 to produce decreased water absorption in the stated materials, free flowing characteristics, reduction in caking, hygroscopicity, etc.

*Example 4.*—Anhydrous, granular aluminum chloride was passed three times through a 6 inch column of silico chloroform vapor and after such treatment was found to hydrolyze less rapidly on contact with moisture than the untreated material. The treated sample flowed much more freely. In lieu of the silico chloroform vapor, alkyl silicon halides may be employed, or mixtures of the silico chloroform with alkyl silicon halides may be utilized under similar conditions and method of treatment.

*Example 5.*—Granulated sugar was passed once through the 6 inch column of silico chloroform vapor. When dropped on water the treated sugar floated for a short time while slowly dissolving streamers sank down from the particles. After about 5 seconds, the sugar slowly sank and finally dissolved, yielding a clear solution. Untreated sugar sank immediately. No difference was noted in taste between treated and untreated sugar either in solid form or in solution.

Similarly the sugar may be treated with the organo silicon halides as set forth above or with mixtures of the organo silicon halides and the silicon halohydrides to produce analogous results.

*Example 6.*—Samples of coarse table salt were passed through the 6-inch column of silico chloroform vapor: one sample three times and the other sample 6 times. The former sample on being dropped in the water floated for several seconds, then sank in one mass, and slowly dissolved. The latter sample floated and was insoluble in water. The particles of untreated salt when dropped on water dispersed themselves and sank to the bottom. The treated samples flowed very much more freely.

Similarly the salt may be treated with mixtures of the silicon halohydrides such as silicon chloroform with organo silicon halides such as methyl silicon chloride, or the organo silicon halides may be used alone.

*Example 7.*—Highly powdered muscovite mica, of the type known commercially as "Mineralite," was passed once through the 6 inch column of silico chloroform vapor. Both treated and untreated samples floated when dropped on the water, but on stirring the untreated samples wet through and sank to the bottom.

*Example 8.*—60-mesh magnesium powder passed twice through the column of silico chloroform vapor could not be made to sink in water.

*Example 9.*—A high grade of plaster of Paris powder was treated with silico chloroform vapor for periods of various duration. The samples passed through the column of silico chloroform vapor once and 4 times were so water repellent that they could not be hydrated to yield a molding paste. A wetting agent in the water, such as soap, tended to break down the water repellency of the former sample and cause it to wet through but had no effect on the latter. A very short treatment of the plaster of Paris with a very dilute air mixture of the silico chloroform vapor gave a product which floated indefinitely when dropped on water, but went immediately into suspension upon stirring. Untreated plaster sank and went into suspension immediately when dropped on water. A molding paste prepared from the very midly treated plaster of Paris exhibited the same handling characteristics as that prepared from untreated plaster and set to the usual strength in the normal period of time. All of the treated plaster samples flowed much more freely than the untreated and clumped less readily.

*Example 10.*—A 0.05% solution of silico chloroform in a light petroleum fraction known commercially as "Skelly-solve-B" was used to wash over samples of sodium sulfate, ammonium nitrate, and disodium phosphate. After air drying all specimens exhibited strong water repellent properties.

*Example 11.*—Portland cement powder was given a vapor phase treatment by being dropped through a 20-inch column of silico chloroform vapor. The treated material floated when dropped on water but upon vigorous stirring rapidly became hydrated, whereas untreated cement sinks and hydrates immediately. The treated cement was noticeably smoother and freer flowing, although the final hydration product of both treated and untreated samples were identical in all respects.

*Example 12.*—Two different compositions of phosphate baking powders were each divided into three portions. The first portions were untreated and kept as a control. The second portions were passed once through a 6-inch column of silico chloroform vapors and the third were passed through the same column three times. On being dropped into water the untreated controls sank immediately and effervesced. The midly treated specimens floated and slowly sent down streamers into the water which reacted as they sank. The heavily treated examples floated and did not react until the water was warmed.

As explained above in connection with Examples 1 to 6, so too Examples 7 to 12 may be carried out by utilizing organo silicon halides in lieu of the silico chloroform, for example, methyl and ethyl silicon chlorides, etc. may be so utilized, or mixtures of the organo silicon halides with the silicon halohydride may be employed. Or as explained earlier in the specification these substances and groups of substances may be applied successively to the treatment of one or more materials, either in the same batch or in separate batches for subsequent mixing, etc.

Further, in lieu of the alkyl silicon halides such as methyl silicon halide, etc., and alkyl silicochloroform such as methyl silicochloroform, etc., may be used either by itself for any of the treatments set forth herein, or in mixtures with any of the other stated materials for any of the purposes set forth above.

This application is a continuation-in-part of Serial No. 585,202 filed March 27, 1945 entitled "Water Repellent Articles" in which the claims are directed to articles of manufacture of a solid substance specifically fibrous materials treated while dry with silicochloroform to produce water repellency; whereas in the instant case particulate or powdered substances are treated with silicochloroform.

Having thus set forth our invention, we claim:

1. An article of manufacture comprising sodium chloride treated with silicochloroform unreactive with said substance and in fluid form to reduce its hygroscopicity the treated substance showing no perceptible change other than in respect to its water repellent properties.

2. A hygroscopic water-soluble solid body having incorporated on the surface thereof, a thin coating of a silicon halide selected from the group consisting of silicochloroform and a vaporizable organo-silicon halide having an Si—H bond whereby the body is rendered non-hydroscopic without destroying its water solubility.

3. The process of treating a hygroscopic water-soluble solid body which comprises contacting said body with, as the only essential hydrophobing agent, the vapors of an organo-silicon halide having an Si—H bond whereby the body is rendered non-hygroscopic without destroying its water solubility.

4. Process according to claim 3 in which the organo silicon halide is methyl hydrogen silicon chloride.

5. The process of treating common salt by which common salt is rendered non-hygroscopic without destroying its water solubility, which comprises contacting said common salt with, as the only essential hydrophobing agent, the vapors of an organo silicon halide having an Si—H bond.

6. The process of treating common salt according to claim 5 in which the organo hydrogen silicon halide is methyl hydrogen silicon chloride.

7. A hygroscopic water-soluble solid body having incorporated on the surface thereof a coating of an organo-silicon halide having an Si—H bond as the only essential hydrophobing agent whereby the body is rendered nonhydroscopic without destroying its water solubility.

8. Common salt having incorporated on the surface thereof a coating of an organo-silicon halide having an Si—H bond as the only essential hydrophobing agent whereby the salt is rendered non-hygroscopic without destroying its water solubility.

9. Ammonium nitrate having incorporated on the surface thereof a coating of an organo-silicon halide having an Si—H bond as the only essential hydrophobing agent whereby the nitrate is rendered non-hygroscopic without destroying its water solubility.

10. An article of manufacture comprising a hygroscopic water-soluble solid body treated with an inorganic silicon halide having an Si—H bond said halide being unreactive with said body and in fluid form to reduce its hygroscopicity the treated substance showing no perceptible change other than in respect to its water repellent properties.

11. An article of manufacture comprising sodium chloride treated with an inorganic silicon halide having an Si—H bond said halide being unreactive with sodium chloride and in fluid form to reduce its hygroscopicity the treated substance showing no perceptible change other than in respect to its water repellent properties.

12. An article of manufacture comprising a hygroscopic water-soluble solid body treated with silicochloroform unreactive with said body and in fluid form to reduce its hygroscopicity, the treated body showing no perceptible change other than in respect to its water repellent properties.

References Cited in the file of this patent

UNITED STATES PATENTS

| Number | Name | Date |
| --- | --- | --- |
| 1,310,037 | Snelling | July 15, 1919 |
| 1,793,420 | Block | Feb. 17, 1931 |
| 1,932,434 | Wyler | Oct. 31, 1933 |
| 1,935,575 | Neuberg | Nov. 14, 1933 |
| 1,944,825 | Millner | Jan. 23, 1934 |
| 2,104,488 | Kennedy et al. | Jan. 4, 1938 |
| 2,234,484 | Weinig | Mar. 11, 1941 |
| 2,258,218 | Rochaw | Oct. 7, 1941 |
| 2,265,962 | Bent | Dec. 9, 1941 |
| 2,272,342 | Hyde | Feb. 10, 1942 |
| 2,286,763 | Rochaw | June 6, 1942 |
| 2,306,222 | Patnode | Dec. 22, 1942 |
| 2,413,491 | Fajans | Dec. 13, 1946 |
| 2,418,935 | Hutchinson | Apr. 15, 1947 |
| 2,439,689 | Hyde | Apr. 13, 1948 |
| 2,469,625 | Barry | May 10, 1949 |
| 2,502,286 | Sowa | Mar. 28, 1950 |
| 2,507,200 | Elliott et al. | May 9, 1950 |
| 2,510,661 | Safford | June 6, 1950 |

FOREIGN PATENTS

| Number | Country | Date |
| --- | --- | --- |
| 116,470 | Australia | Feb. 4, 1943 |
| 72,202 | Switzerland | Nov. 16, 1917 |

OTHER REFERENCES

Ser. No. 333,186, Geffcken (A. P. C.), published June 1, 1943.

Mellor: Comprehensive Treatise on Inorganic and Theoretical Chemistry, vol. 6 (1925), Longmans, Green and Co., N. Y., pages 962, 967, 969, 970, 972, 973, 979, 983.

Rochow: "The Organosilicon Polymers" Chemical and Eng. News, vol. 23, No. 7, April 1945, pages 612 to 616.